(No Model.)
J. W. RUSH.
SULKY HARROW.
No. 261,386. Patented July 18, 1882.
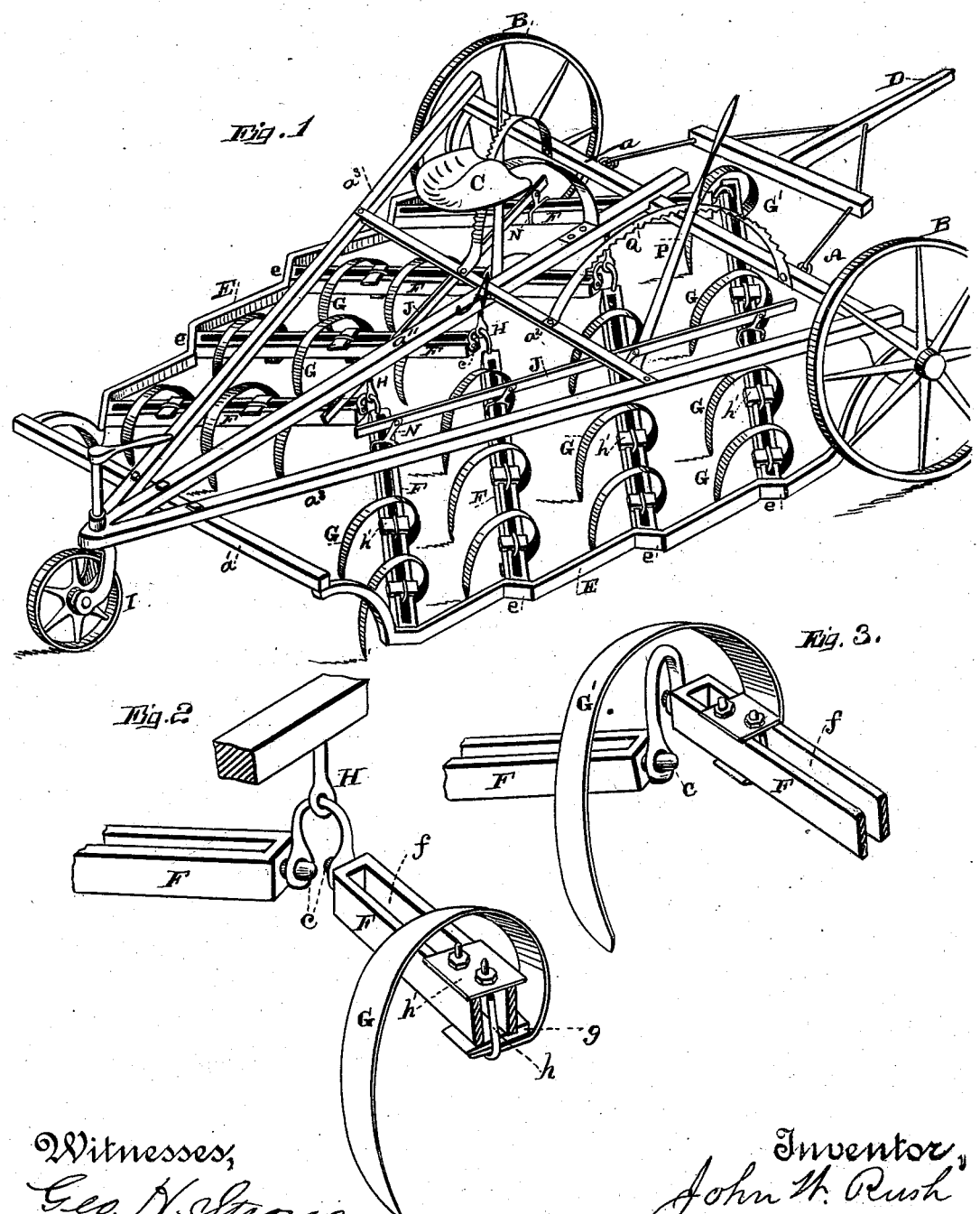

UNITED STATES PATENT OFFICE.

JOHN W. RUSH, OF STOCKTON, CALIFORNIA.

SULKY-HARROW.

SPECIFICATION forming part of Letters Patent No. 261,386, dated July 18, 1882.

Application filed April 21, 1882. (No model.)

*To all whom it may concern:*

Be it known that I, JOHN W. RUSH, of Stockton, county of San Joaquin, State of California, have invented an Improved Sulky-Harrow; and I hereby declare the following to be a full, clear, and exact description thereof.

My invention relates to a certain class of sulky-harrows and to certain new and useful improvements therein.

These improvements consist in certain details of construction, as hereinafter fully described, and specifically pointed out in the claims.

Referring to the accompanying drawings, Figure 1 is a perspective view. Figs. 2 and 3 are details of construction.

Let A represent the main frame. This consists of the forward beam or axle, $a$, upon which the wheels B are journaled, the rear beam, $a'$, the central beam, $a^2$, and the inclined braces $a^3$. The central beam carries the driver's seat C, and to the forward beam is suitably connected the draft-bar D. The main frame is supported at its rear end by a swiveled wheel, I. Under the ends of the front and rear beams are secured the side beams, E E. These are constructed with inclined shoulders $e\ e$ at intervals.

F represents bars which carry the spring-teeth G. These bars consist each of two parallel flat strips of metal, the ends of which are provided with shoulders, which fit against each other, and thus allow the strips to have a space or elongated slot, $f$, between them. These ends are welded together, and formed into or provided with a pin or point, $c$.

The outer points are journaled in the inclined shoulders of the side beams, E, and the bars converge forwardly to a line under the central beam of the main frame, where their inner points are journaled in bearings H, secured above to said central beam. These bearings I have here shown as metal strips having two eyes or sockets at their lower ends, in which the bars F are journaled. The foremost of these bearings, instead of having its eyes or sockets in a line across the frame, has them parallel with the sides, and the ends of the forward bars, F, thus overlap. The object of this is to enable me to place a tooth, $G'$, in the central line of the harrow, as shown.

G are ordinary spring-teeth; but they are secured upon the bars F at an angle, so that they may lie parallel with the sides of the harrow. Lying thus at an angle upon the bars, I have to interpose an inclined block, $g$, between their ends and the bars, where they are secured to their under sides. This block keeps them securely at the angle set by furnishing them a proper bearing and support. A clip, $h$, passes up from below on each side of the tooth and block, and up through the slot $f$ in the bars F, and is secured above by a wide yoke-plate, $h'$, and nuts. By loosening these nuts the tooth may be adjusted from one position upon the bar to another. By thus having the bars converge and the teeth secured upon them at an angle the surface of the ground may be thoroughly worked, and the teeth will not be clogged in their passage, as the large clods and obstructions will slip by.

In order to turn the teeth out of the ground, I have the bars J J extending over the bars F and secured to them by strips N. To these bars J are secured the levers P, which engage with curved racks Q above.

Having thus described my invention, what I claim as new, and desire to secure by Letters Patent, is—

1. In a harrow, the frame A, having the side beams, E E, with their inclined shoulders $e\ e$, in combination with tooth-carrying bars F, journaled in the shoulders $e$, and converging forward to a central line and journaled in strips or bearings H, substantially as herein described.

2. In a harrow, the forwardly-converging rocking bars F, constructed of two parallel strips having between them a slot, $f$, and their ends formed into pins or points $e$, as shown, in combination with the spring-teeth G, secured at an angle upon said bars by means of the inclined supporting-blocks $g$, clips $h$, yoke-plates $h'$, and nuts, substantially as herein described.

In witness whereof I hereto set my hand.

JOHN W. RUSH.

Witnesses:
S. H. NOURSE,
G. W. EMERSON.